United States Patent
Wang

(10) Patent No.: US 12,395,654 B2
(45) Date of Patent: *Aug. 19, 2025

(54) CONSTRAINTS ON DECODING PICTURE BUFFER

(71) Applicant: Bytedance Inc., Los Angeles, CA (US)

(72) Inventor: Ye-kui Wang, San Diego, CA (US)

(73) Assignee: BYTEDANCE INC., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/525,428

(22) Filed: Nov. 30, 2023

(65) Prior Publication Data

US 2024/0107041 A1    Mar. 28, 2024

Related U.S. Application Data

(63) Continuation of application No. 18/076,897, filed on Dec. 7, 2022, now Pat. No. 11,856,212, which is a
(Continued)

(51) Int. Cl.
*H04N 19/132* (2014.01)
*H04N 19/105* (2014.01)
(Continued)

(52) U.S. Cl.
CPC ......... *H04N 19/423* (2014.11); *H04N 19/105* (2014.11); *H04N 19/132* (2014.11); *H04N 19/152* (2014.11); *H04N 19/174* (2014.11)

(58) Field of Classification Search
CPC ..................... H04N 19/423; H04N 19/105
See application file for complete search history.

(56) References Cited

U.S. PATENT DOCUMENTS 8,340,510 B2    12/2012  Wu
9,124,891 B2 *  9/2015   Jeon ............... H04N 19/13
(Continued)

FOREIGN PATENT DOCUMENTS

JP    2017517194 A    6/2017
JP       7544868 B2    9/2024
WO   2013067033 A1    5/2013

OTHER PUBLICATIONS

"Series H: Audiovisual and Multimedia Systems Infrastructure of audiovisual services—Coding of moving video High efficiency video coding," Rec. ITU-T H.265 | ISO/IEC 23008-2 (in force edition), Nov. 2019, 712 pages.
(Continued)

*Primary Examiner* — Irfan Habib
(74) *Attorney, Agent, or Firm* — Conley Rose, P.C.

(57) ABSTRACT

Methods, systems and devices for implementing constraints used in video encoding and video decoding are described. An example method of video processing includes performing a conversion between a video comprising one or more pictures comprising one or more slices and a bitstream of the video. The conversion conforms to a rule, and the bitstream is organized into one or more access units. The rule specifies a constraint on a number of decoded pictures stored in a decoded picture buffer (DPB). Each decoded picture of the decoded pictures is (i) marked as used for reference, (ii) has a flag indicative of the decoded picture being output, and (iii) has an output time later than a decoding time of a current picture.

20 Claims, 8 Drawing Sheets

Related U.S. Application Data continuation of application No. PCT/US2021/036469, filed on Jun. 8, 2021.

(60) Provisional application No. 63/036,321, filed on Jun. 8, 2020.

(51) Int. Cl.
*H04N 19/152* (2014.01)
*H04N 19/174* (2014.01)
*H04N 19/423* (2014.01)

(56) References Cited

U.S. PATENT DOCUMENTS

| | | | | |
|---|---|---|---|---|
| 9,491,456 | B2* | 11/2016 | Wang | H04N 19/70 |
| 10,250,895 | B2* | 4/2019 | Deshpande | H04N 19/70 |
| 11,770,498 | B2* | 9/2023 | Wang | H04N 19/30 |
| | | | | 375/240.01 |
| 11,818,337 | B2* | 11/2023 | Wang | H04N 19/159 |
| 11,871,143 | B2* | 1/2024 | Wang | H04N 19/177 |
| 11,936,865 | B2* | 3/2024 | Wang | H04N 19/85 |
| 2008/0117988 | A1 | 5/2008 | Toma | |
| 2011/0235709 | A1* | 9/2011 | Shi | H04N 19/37 |
| | | | | 375/E7.243 |
| 2012/0147973 | A1* | 6/2012 | Wu | H04N 19/44 |
| | | | | 375/240.01 |
| 2013/0077681 | A1 | 3/2013 | Chen | |
| 2013/0114741 | A1 | 5/2013 | Sullivan | |
| 2013/0266075 | A1 | 10/2013 | Wang | |
| 2013/0279600 | A1* | 10/2013 | Toma | H04N 19/70 |
| | | | | 375/240.25 |
| 2014/0016710 | A1 | 1/2014 | Rodriguez | |
| 2014/0086332 | A1 | 3/2014 | Wang | |
| 2014/0086341 | A1* | 3/2014 | Wang | H04N 19/44 |
| | | | | 375/240.28 |
| 2014/0086344 | A1* | 3/2014 | Wang | H04N 19/46 |
| | | | | 375/240.28 |
| 2014/0192882 | A1 | 7/2014 | Wang | |
| 2014/0254672 | A1* | 9/2014 | Misra | H04N 19/587 |
| | | | | 375/240.12 |
| 2015/0016543 | A1 | 1/2015 | Rapaka | |
| 2015/0103884 | A1 | 4/2015 | Ramasubramanian | |
| 2015/0131744 | A1* | 5/2015 | Samuelsson | H04N 21/8451 |
| | | | | 375/240.26 |
| 2015/0150069 | A1* | 5/2015 | Deshpande | H04N 19/44 |
| | | | | 725/116 |
| 2015/0195545 | A1* | 7/2015 | Wang | H04N 19/103 |
| | | | | 375/240.02 |
| 2015/0195578 | A1* | 7/2015 | Chen | H04N 21/2401 |
| | | | | 375/240.26 |
| 2015/0264370 | A1* | 9/2015 | Ramasubramanian | |
| | | | | H04N 19/423 |
| | | | | 375/240.02 |
| 2015/0319462 | A1 | 11/2015 | Ramasubramanian | |
| 2015/0365702 | A1 | 12/2015 | Deshpande | |
| 2016/0366428 | A1 | 12/2016 | Deshpande | |
| 2017/0264916 | A1* | 9/2017 | Samuelsson | H04N 19/85 |
| 2019/0215517 | A1 | 7/2019 | Ramasubramanian | |
| 2021/0195175 | A1* | 6/2021 | Seregin | H04N 19/44 |
| 2021/0274201 | A1* | 9/2021 | Xu | H04N 19/593 |
| 2021/0274202 | A1* | 9/2021 | Xu | H04N 19/132 |
| 2022/0232257 | A1* | 7/2022 | Wang | H04N 19/46 |
| 2022/0312042 | A1* | 9/2022 | Deshpande | H04N 19/70 |
| 2023/0007270 | A1* | 1/2023 | Esenlik | H04N 19/14 |
| 2023/0016439 | A1* | 1/2023 | Deshpande | H04N 19/70 |
| 2023/0019459 | A1* | 1/2023 | Xu | H04N 19/176 |
| 2023/0034458 | A1* | 2/2023 | Chen | H04N 19/70 |

OTHER PUBLICATIONS

JVET-G1001-v1, Chen, J., et al., "Algorithm Description of Joint Exploration Test Model 7 (JEM 7)," Joint Video Exploration Team (JVET) of ITU-T SG 16 WP 3 and ISO/IEC JTC 1/SC 29/WG 11 7th Meeting: Torino, IT, Jul. 13-21, 2017, 50 pages.

JVET-R2001-vB, Bross, B., et al., "Versatile Video Coding (Draft 9)," Joint Video Experts Team (JVET) of ITU-T SG 16 WP 3 and ISO/IEC JTC 1/SC 29/WG 11 18th Meeting: by teleconference, Apr. 15-24, 2020, 530 pages.

JVET-S0152-v5, Wang, Y., "AHG2: Editorial input of a text integration for the May 2020 HLS AHG meeting outcome," Joint Video Experts Team (JVET) of ITU-T SG 16 WP 3 and ISO/IEC JTC 1/SC 29/WG 11 19th Meeting: by teleconference, Jun. 22-Jul. 1, 2020, 5 pages.

JVET-Q2002-v3, Chen, J., et al., "Algorithm description for Versatile Video Coding and Test Model 8 (VTM 8)," Joint Video Experts Team (JVET) of ITU-T SG 16 WP 3 and ISO/IEC JTC 1/SC 29/WG 11 17th Meeting: Brussels, BE, Jan. 7-17, 2020, 97 pages.

Bossen, F., Retrieved from the internet: VTM software: https://vcgit.hhi.fraunhofer.de/jvet/VVCSoftware_VTM.git, Mar. 2, 2023, 3 pages.

Ozbek, N., et al. "A survey on the H. 264/AVC standard," Turkish journal of electrical engineering computer sciences vol. 13, No. 3, Article 1, Jan. 1, 2005, 17 pages.

"Series H: Audiovisual and Multimedia Systems Infrastructure of audiovisual services—Coding of moving video High efficiency video coding," Recommendation ITU-T H.265, Feb. 2018, 692 pages.

Document: JVET-Q0112-v1, Wang, Y.K., et al., "On level definitions," Joint Video Experts Team (JVET) of ITU-T SG 16 WP 3 and ISO/IEC JTC 1/SC 29/WG 11 17th Meeting: Brussels, BE, Jan. 7-17, 2020, 6 pages.

Document: JVET-Q2001-v8, Bross, B., et al., "Versatile Video Coding (Draft 8)," Joint Video Experts Team (JVET) of ITU-T Sg 16 WP 3 and ISO/IEC JTC 1/SC 29/WG 11 17th Meeting: Brussels, BE, Jan. 7-17, 2020, 497 pages.

Document: JVET-Q2001-vE, Bross, B., et al., "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, 512 pages.

Foreign Communication From a Related Counterpart Application, PCT Application No. PCT/US2021/036462, International Search Report dated Sep. 2, 2021, 16 pages.

Foreign Communication From a Related Counterpart Application, PCT Application No. PCT/US2021/036469, International Search Report dated Sep. 17, 2021, 15 pages.

Non-Final Office Action dated Apr. 7, 2023, 13 pages, U.S. Appl. No. 18/076,886, filed Dec. 7, 2022.

Extended European Search Report from European Application No. 21821747.9 dated Oct. 25, 2023, 14 pages.

Notice of Allowance dated Aug. 15, 2023, 24 pages, U.S. Appl. No. 18/076,897 filed Dec. 7, 2022.

Non-Final Office Action dated Apr. 20, 2023, 14 pages, U.S. Appl. No. 18/076,897, filed Dec. 7, 2022.

\* cited by examiner

CONSTRAINTS ON DECODING PICTURE BUFFER

CROSS-REFERENCE TO RELATED APPLICATION

This application is a continuation application of U.S. patent application Ser. No. 18/076,897 filed on Dec. 7, 2022, which is a continuation of International Patent Application No. PCT/US2021/036469 filed on Jun. 8, 2021, which claims the priority to and benefits of U.S. Provisional Patent Application No. 63/036,321 filed on Jun. 8, 2020. All the aforementioned patent applications are hereby incorporated by reference in their entireties.

TECHNICAL FIELD

The present disclosure relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present disclosure discloses techniques that can implement constraints used by video encoders and decoders to perform video encoding or decoding.

In one example aspect, a video processing method is disclosed. The method includes performing a conversion between a video comprising one or more pictures comprising one or more slices and a bitstream of the video, wherein the bitstream is organized into a plurality of access units (AUs), AU 0 to AU n, based on a format rule, where n is a positive integer, wherein the format rule specifies a relationship between removal times of each of the plurality of AUs from a coded picture buffer (CPB) during decoding and a number of slices in the each of the plurality of AUs.

In another example aspect, another video processing method is disclosed. The method includes performing a conversion between a video comprising one or more pictures comprising one or more tiles and a bitstream of the video, wherein the bitstream is organized into a plurality of access units (AUs), AU 0 to AU n, based on a format rule, wherein n is a positive integer, wherein the format rule specifies a relationship between removal times of each of the plurality of AUs from a coded picture buffer (CPB) and a number of tiles in the each of the plurality of AUs.

In yet another example aspect, another video processing method is disclosed. The method includes performing a conversion between a video comprising one or more pictures comprising one or more slices and a bitstream of the video, wherein the conversion conforms to a rule, wherein the bitstream is organized into one or more access units, wherein the rule specifies a constraint on a number of decoded pictures stored in a decoded picture buffer (DPB), wherein each decoded picture of the decoded pictures is (i) marked as used for reference, (ii) has a flag indicative of the decoded picture being output, and (iii) has an output time later than a decoding time of a current picture.

In yet another example aspect, a video encoder apparatus is disclosed. The video encoder comprises a processor configured to implement above-described methods.

In yet another example aspect, a video decoder apparatus is disclosed. The video decoder comprises a processor configured to implement above-described methods.

In yet another example aspect, a computer readable medium having code stored thereon is disclose. The code embodies one of the methods described herein in the form of processor-executable code.

These, and other, features are described throughout the present disclosure.

DETAILED DESCRIPTION

Figure 1:
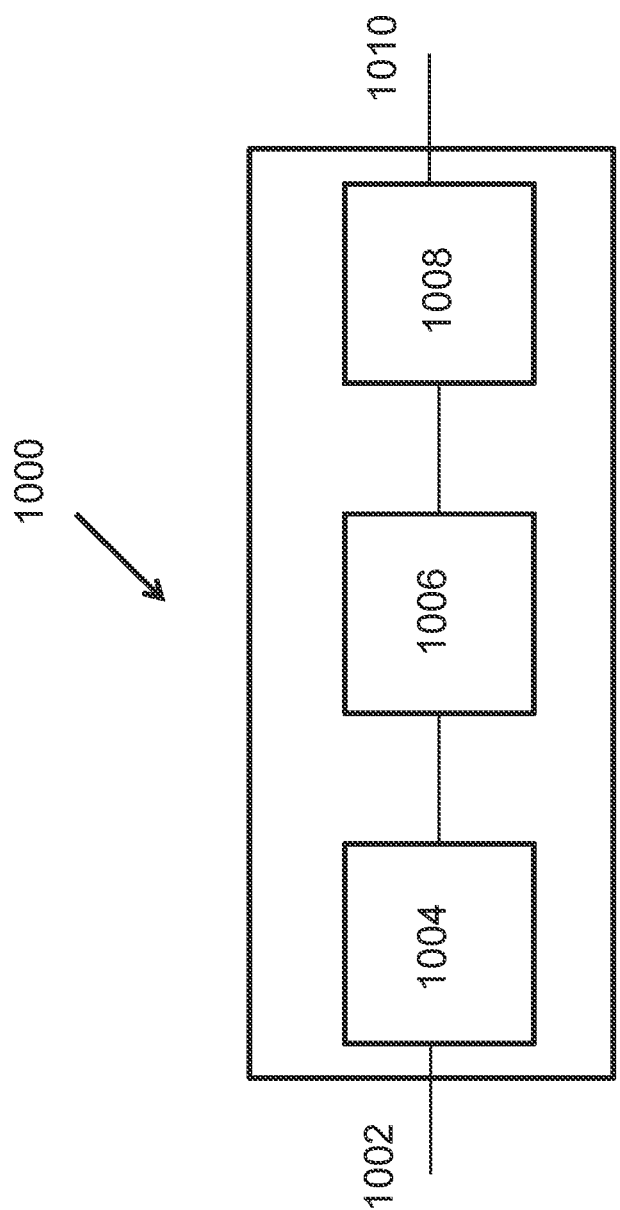
FIG. 1 is a block diagram showing an example video processing system in which various techniques disclosed herein may be implemented.

Section headings are used in the present disclosure for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also.

1. Introduction

This disclosure is related to video coding technologies. Specifically, it is about defining levels and bitstream conformance for a video codec that supports both single-layer video coding and multi-layer video coding. It may be applied to any video coding standard or non-standard video codec that supports single-layer video coding and multi-layer video coding, e.g., Versatile Video Coding (VVC) that is being developed.

2. Abbreviations

APS Adaptation Parameter Set
AU Access Unit
AUD Access Unit Delimiter
AVC Advanced Video Coding
CLVS Coded Layer Video Sequence
CPB Coded Picture Buffer
CRA Clean Random Access
CTU Coding Tree Unit
CVS Coded Video Sequence
CLVSS Coded Layer Video Sequence Start
DPB Decoded Picture Buffer DPS Decoding Parameter Set
DU Decoding Unit
EOB End Of Bitstream
EOS End Of Sequence
GCI General Constraints Information
GDR Gradual Decoding Refresh
HEVC High Efficiency Video Coding
HRD Hypothetical Reference Decoder
IDR Instantaneous Decoding Refresh
IRAP Intra Random Access Point
JEM Joint Exploration Model
MCTS Motion-Constrained Tile Sets
NAL Network Abstraction Layer
OLS Output Layer Set
PH Picture Header
PPS Picture Parameter Set
PTL Profile, Tier and Level
PU Picture Unit
RADL Random Access Decodable Leading
RASL Random Access Skipped Leading
RRP Reference Picture Resampling
RBSP Raw Byte Sequence Payload
SEI Supplemental Enhancement Information
SH Slice Header
SPS Sequence Parameter Set
STRP Short Term Reference Picture
SVC Scalable Video Coding
VCL Video Coding Layer
VPS Video Parameter Set
VTM VVC Test Model
VUI Video Usability Information
VVC Versatile Video Coding

3. Initial Discussion

Video coding standards have evolved primarily through the development of the well-known International Telecommunication Union—Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, the Joint Video Exploration Team (JVET) was founded by Video Coding Experts Group (VCEG) and MPEG jointly in 2015. Since then, many new methods have been adopted by JVET and put into the reference software named Joint Exploration Model (JEM). The JVET meeting is concurrently held once every quarter, and the new coding standard is targeting at 50% bitrate reduction as compared to HEVC. The new video coding standard was officially named as Versatile Video Coding (VVC) in the April 2018 JVET meeting, and the first version of VVC test model (VTM) was released at that time. As there are continuous effort contributing to VVC standardization, new coding techniques are being adopted to the VVC standard in every JVET meeting. The VVC working draft and test model VTM are then updated after every meeting. The VVC project is now aiming for technical completion (FDIS) at the July 2020 meeting.

3.1. Picture Resolution Change Within a Sequence

In AVC and HEVC, the spatial resolution of pictures cannot change unless a new sequence using a new SPS starts, with an Intra Random Access Point (IRAP) picture. VVC enables picture resolution change within a sequence at a position without encoding an IRAP picture, which is always intra-coded. This feature is sometimes referred to as reference picture resampling (RPR), as the feature needs resampling of a reference picture used for inter prediction when that reference picture has a different resolution than the current picture being decoded.

The scaling ratio is restricted to be larger than or equal to 1/2 (2 times downsampling from the reference picture to the current picture), and less than or equal to 8 (8 times upsampling). Three sets of resampling filters with different frequency cutoffs are specified to handle various scaling ratios between a reference picture and the current picture. The three sets of resampling filters are applied respectively for the scaling ratio ranging from 1/2 to 1/1.75, from 1/1.75 to 1/1.25, and from 1/1.25 to 8. Each set of resampling filters has 16 phases for luma and 32 phases for chroma which is same to the case of motion compensation interpolation filters. Actually the normal MC interpolation process is a special case of the resampling process with scaling ratio ranging from 1/1.25 to 8. The horizontal and vertical scaling ratios are derived based on picture width and height, and the left, right, top and bottom scaling offsets specified for the reference picture and the current picture.

Other aspects of the VVC design for support of this feature that are different from HEVC include: i) The picture resolution and the corresponding conformance window are signaled in the PPS instead of in the SPS, while in the SPS the maximum picture resolution is signaled. ii) For a single-layer bitstream, each picture store (a slot in the DPB for storage of one decoded picture) occupies the buffer size as required for storing a decoded picture having the maximum picture resolution.

3.2. Scalable Video Coding (SVC) in General and in VVC

Scalable video coding (SVC, sometimes also just referred to as scalability in video coding) refers to video coding in which a base layer (BL), sometimes referred to as a reference layer (RL), and one or more scalable enhancement layers (ELs) are used. In SVC, the base layer can carry video data with a base level of quality. The one or more enhancement layers can carry additional video data to support, for example, higher spatial, temporal, and/or signal-to-noise (SNR) levels. Enhancement layers may be defined relative to a previously encoded layer. For example, a bottom layer may serve as a BL, while a top layer may serve as an EL. Middle layers may serve as either ELs or RLs, or both. For example, a middle layer (e.g., a layer that is neither the lowest layer nor the highest layer) may be an EL for the layers below the middle layer, such as the base layer or any intervening enhancement layers, and at the same time serve as a RL for one or more enhancement layers above the middle layer. Similarly, in the Multiview or 3D extension of the HEVC standard, there may be multiple views, and information of one view may be utilized to code (e.g., encode or decode) the information of another view (e.g., motion estimation, motion vector prediction and/or other redundancies).

In SVC, the parameters used by the encoder or the decoder are grouped into parameter sets based on the coding level (e.g., video-level, sequence-level, picture-level, slice level, etc.) in which they may be utilized. For example, parameters that may be utilized by one or more coded video sequences of different layers in the bitstream may be included in a video parameter set (VPS), and parameters that are utilized by one or more pictures in a coded video sequence may be included in a sequence parameter set (SPS). Similarly, parameters that are utilized by one or more slices in a picture may be included in a picture parameter set (PPS), and other parameters that are specific to a single slice may be included in a slice header. Similarly, the indication of which parameter set(s) a particular layer is using at a given time may be provided at various coding levels.

Thanks to the support of reference picture resampling (RPR) in VVC, support of a bitstream containing multiple layers, e.g., two layers with standard definition (SD) and high definition (HD) resolutions in VVC can be designed without the need any additional signal-processing-level coding tool, as upsampling needed for spatial scalability support can just use the RPR upsampling filter. Nevertheless, high-level syntax changes (compared to not supporting scalability) are needed for scalability support. Scalability support is specified in VVC version 1. Different from the scalability supports in any earlier video coding standards, including in extensions of AVC and HEVC, the design of VVC scalability has been made friendly to single-layer decoder designs as much as possible. The decoding capability for multi-layer bitstreams are specified in a manner as if there were only a single layer in the bitstream. E.g., the decoding capability, such as DPB size, is specified in a manner that is independent of the number of layers in the bitstream to be decoded. Basically, a decoder designed for single-layer bitstreams does not need much change to be able to decode multi-layer bitstreams. Compared to the designs of multi-layer extensions of AVC and HEVC, the high level syntax (HLS) aspects have been significantly simplified at the sacrifice of some flexibilities. For example, an IRAP access unit (AU) is required to contain a picture for each of the layers present in the Coded Video Sequence (CVS).

3.3. Parameter Sets

AVC, HEVC, and VVC specify parameter sets. The types of parameter sets include SPS, PPS, Adaptation Parameter Set (APS), and VPS. SPS and PPS are supported in all of AVC, HEVC, and VVC. VPS was introduced since HEVC and is included in both HEVC and VVC. APS was not included in AVC or HEVC but is included in the latest VVC draft text.

SPS was designed to carry sequence-level header information, and PPS was designed to carry infrequently changing picture-level header information. With SPS and PPS, infrequently changing information need not to be repeated for each sequence or picture, hence redundant signaling of this information can be avoided. Furthermore, the use of SPS and PPS enables out-of-band transmission of the important header information, thus not only avoiding the need for redundant transmissions but also improving error resilience.

VPS was introduced for carrying sequence-level header information that is common for all layers in multi-layer bitstreams.

APS was introduced for carrying such picture-level or slice-level information that needs quite some bits to code, can be shared by multiple pictures, and in a sequence there can be quite many different variations.

3.4. Profiles, Tier, and Levels

Video coding standards usually specify profiles and levels. Some video coding standards also specify tiers, e.g., HEVC and the being-developed VVC.

Profiles, tiers, and levels specify restrictions on bitstreams and hence limits on the capabilities needed to decode the bitstreams. Profiles, tiers and levels may also be used to indicate interoperability points between individual decoder implementations.

Each profile specifies a subset of algorithmic features and limits that shall be supported by all decoders conforming to that profile. Note that encoders are not required to make use of all coding tools or features supported in a profile, while decoders conforming to a profile are required to support all coding tools or features.

Each level of a tier specifies a set of limits on the values that may be taken by the bitstream syntax elements. The same set of tier and level definitions is usually used with all profiles, but individual implementations may support a different tier and within a tier a different level for each supported profile. For any given profile, a level of a tier generally corresponds to a particular decoder processing load and memory capability.

Capabilities of video decoders conforming to a video codec specification are specified in terms of the ability to decode video streams conforming to the constraints of profiles, tiers and levels specified in the video codec specification. When expressing the capabilities of a decoder for a specified profile, the tier and level supported for that profile should also be expressed.

3.5. Existing VVC Tier and Level Definitions

In the latest VVC draft text in JVET-S0152-v5, the tier and level definitions are as follows.
A.4.1 General Tier and Level Limits For purposes of comparison of tier capabilities, the tier with general_tier_flag equal to 0 (i.e., the Main tier) is considered to be a lower tier than the tier with general_tier_flag equal to 1 (i.e., the High tier). For purposes of comparison of level capabilities, a particular level of a specific tier is considered to be a lower level than some other level of the same tier when the value of the general_level_idc or sublayer_level_idc[i] of the particular level is less than that of the other level.

The following is specified for expressing the constraints in this annex:
Let AU n be the n-th AU in decoding order, with the first AU being AU 0 (i.e., the 0-th AU).
For an Output Layer Set (OLS) with OLS index TargetOlsIdx, the variables PicWidthMaxInSamplesY, PicHeightMaxInSamplesY, and PicSizeMaxInSamplesY, and the applicable dpb_parameters( )syntax structure are derived as follows:
If NumLayersInOls[TargetOlsIdx] is equal to 1, PicWidthMaxInSamplesY is set equal to sps_pic_width_max_in_luma_samples, PicHeightMaxInSamplesY is set equal to sps_pic_height_max_in_luma_samples, and PicSizeMaxInSamplesY is set equal to PicWidthMaxInSamplesY*PicHeightMaxInSamplesY, where sps_pic_width_max_in_luma_samples and sps_pic_height_max_in_luma_samples are found in the SPS referred to by the layer in the OLS, and the applicable dpb_parameters( ) syntax structure is also found in that SPS.
Otherwise (NumLayersInOls[TargetOlsIdx] is greater than 1), PicWidthMaxInSamplesY is set equal to vps_ols_dpb_pic_width[MultiLayerOlsIdx[TargetOlsIdx]], PicHeightMaxInSamplesY is set equal to vps_ols_dpb_pic_height[MultiLayerOlsIdx[TargetOlsIdx]], PicSizeMaxInSamplesY is set equal to PicWidthMaxInSamplesY*PicHeightMaxInSamplesY, and the applicable dpb_parameters( ) syntax structure is identified by vps_ols_dpb_params_idx[MultiLayerOlsIdx[TargetOlsIdx]] found in the VPS.

When the specified level is not level 15.5, bitstreams conforming to a profile at a specified tier and level shall obey the following constraints for each bitstream conformance test as specified in Annex C:

a) PicSizeMaxInSamplesY shall be less than or equal to MaxLumaPs, where MaxLumaPs is specified in Table A.1.
b) The value of PicWidthMaxInSamplesY shall be less than or equal to Sqrt(MaxLumaPs*8).
c) The value of PicHeightMaxInSamplesY shall be less than or equal to Sqrt(MaxLumaPs*8).
d) For each referenced PPS, the value of NumTileColumns shall be less than or equal to MaxTileCols and the value of NumTileRows shall be less than or equal to MaxTileRows, where MaxTileCols and MaxTileRows are specified in Table A.1.
e) For the Video Coding Layer (VCL) Hypothetical Reference Decoder (HRD) parameters, CpbSize[Htid][i] shall be less than or equal to CpbVclFactor*MaxCPB for at least one value of i in the range of 0 to hrd_cpb_cnt_minus1, inclusive, where CpbSize[Htid][i] is specified in clause 7.4.6.3 based on parameters selected as specified in clause C.1, CpbVclFactor is specified in Table A.3 and MaxCPB is specified in Table A.1 in units of CpbVclFactor bits.
f) For the Network Abstraction Layer (NAL) HRD parameters, CpbSize[Htid][i] shall be less than or equal to CpbNalFactor*MaxCPB for at least one value of i in the range of 0 to hrd_cpb_cnt_minus1, inclusive, where CpbSize[Htid][i] is specified in clause 7.4.6.3 based on parameters selected as specified in clause C.1, CpbNalFactor is specified in Table A.3, and MaxCPB is specified in Table A.1 in units of CpbNalFactor bits.

Table A.1 specifies the limits for each level of each tier for levels other than level 15.5.

A tier and level to which a bitstream conforms are indicated by the syntax elements general_tier_flag and general_level_idc, and a level to which a sublayer representation conforms are indicated by the syntax element sublayer_level_idc[i], as follows:

If the specified level is not level 15.5, general_tier_flag equal to 0 indicates conformance to the Main tier, general_tier_flag equal to 1 indicates conformance to the High tier, according to the tier constraints specified in Table A.1 and general_tier_flag shall be equal to 0 for levels below level 4 (corresponding to the entries in Table A.1 marked with "-"). Otherwise (the specified level is level 15.5), it is a requirement of bitstream conformance that general_tier_flag shall be equal to 1 and the value 0 for general_tier_flag is reserved for future use by ITU-T|ISO/IEC and decoders shall ignore the value of general_tier_flag.

general_level_idc and sublayer_level_idc[i] shall be set equal to a value of general_level_idc for the level number specified in Table A.1.

TABLE A.1

General tier and level limits

| Level | general_level_idc value* | Max luma picture size MaxLumaPs (samples) | Max CPB size MaxCPB (CpbVclFactor or CpbNalFactor bits) | | Max slices per picture MaxSlicesPerPicture | Max # of tile rows MaxTileRows | Max # of tile columns MaxTileCols |
|---|---|---|---|---|---|---|---|
| | | | Main tier | High tier | | | |
| 1.0 | 16 | 36 864 | 350 | — | 16 | 1 | 1 |
| 2.0 | 32 | 122 880 | 1 500 | — | 16 | 1 | 1 |
| 2.1 | 35 | 245 760 | 3 000 | — | 20 | 1 | 1 |
| 3.0 | 48 | 552 960 | 6 000 | — | 30 | 2 | 2 |
| 3.1 | 51 | 983 040 | 10 000 | — | 40 | 3 | 3 |
| 4.0 | 64 | 2 228 224 | 12 000 | 30 000 | 75 | 5 | 5 |
| 4.1 | 67 | 2 228 224 | 20 000 | 50 000 | 75 | 5 | 5 |
| 5.0 | 80 | 8 912 896 | 25 000 | 100 000 | 200 | 11 | 10 |
| 5.1 | 83 | 8 912 896 | 40 000 | 160 000 | 200 | 11 | 10 |
| 5.2 | 86 | 8 912 896 | 60 000 | 240 000 | 200 | 11 | 10 |
| 6.0 | 96 | 35 651 584 | 80 000 | 240 000 | 600 | 22 | 20 |
| 6.1 | 99 | 35 651 584 | 120 000 | 480 000 | 600 | 22 | 20 |
| 6.2 | 102 | 35 651 584 | 180 000 | 800 000 | 600 | 22 | 20 |

*For the level number in the form of major · minor, the value of general_level_idc for each of the above-lisetd levels is equal to major * 16 + minor * 3.

A.4.2 Profile-Specific Level Limits

The following is specified for expressing the constraints in this annex:

Let the variable fR be set equal to 1÷300.

The variable HbrFactor is defined as follows:

If the bitstream is indicated to conform to the Main 10 profile or the Main 4:4:4 10 profile, HbrFactor is set equal to 1.

The variable BrVclFactor, which represents the VCL bit rate scale factor, is set equal to CpbVclFactor*HbrFactor.

The variable BrNalFactor, which represents the NAL bit rate scale factor, is set equal to CpbNalFactor*HbrFactor.

The variable MinCr is set equal to MinCrBase*MinCrScaleFactor÷HbrFactor.

When the specified level is not level 15.5, the value of max_dec_pic_buffering_minus1[Htid]+1 shall be less than or equal to MaxDpbSize, which is derived as follows:

if( PicSizeMaxInSamplesY <= ( MaxLumaPs >> 2 ) )
  MaxDpbSize = Min( 4 * maxDpbPicBuf, 16 )
else if( PicSizeMaxInSamplesY <= ( MaxLumaPs >> 1 ) )
  MaxDpbSize = Min( 2 * maxDpbPicBuf, 16 )   (A.1)
else if( PicSizeMaxInSamplesY <= ( ( 3 * MaxLumaPs) >> 2 ) )

-continued

```
MaxDpbSize = Min( ( 4 * maxDpbPicBuf ) / 3, 16 )
else
    MaxDpbSize = maxDpbPicBuf
``` where MaxLumaPs is specified in Table A.1, maxDpbPicBuf is equal to 8, and max_dec_pic_buffering_minus1[Htid] is found in or derived from the applicable dpb_parameters( ) syntax structure.

Let numDecPics be the number of pictures in AU n. The variable AuSizeMaxInSamplesY[n] is set equal to PicSizeMaxInSamplesY*numDecPics.

Bitstreams conforming to the Main 10 or Main 4:4:4 10 profile at a specified tier and level shall obey the following constraints for each bitstream conformance test as specified in Annex C:

a) The nominal removal time of AU n (with n greater than 0) from the CPB, as specified in clause C.2.3, shall satisfy the constraint that AuNominalRemovalTime[n]−AuCpbRemovalTime[n−1] is greater than or equal to Max(AuSizeMaxInSamplesY[n−1]÷MaxLumaSr, fR), where MaxLumaSr is the value specified in Table A.2 that applies to AU n−1.
  b) The difference between consecutive output times of pictures of different AUs from the DPB, as specified in clause C.3.3, shall satisfy the constraint that DpbOutputInterval[n] is greater than or equal to Max(AuSizeMaxInSamplesY[n]÷MaxLumaSr, fR), where MaxLumaSr is the value specified in Table A.2 for AU n, provided that AU n has a picture that is output and AU n is not the last AU of the bitstream that has a picture that is output.
  c) The removal time of AU 0 shall satisfy the constraint that the number of slices in each picture in AU 0 is less than or equal to Min(Max(1, MaxSlicesPerPicture*MaxLumaSr/MaxLumaPs*(AuCpbRemovalTime[0]−AuNominalRemovalTime[0])+MaxSlicesPerPicture*PicSizeMaxInSamplesY/MaxLumaPs), MaxSlicesPerPicture), for the value of PicSizeMaxInSamplesY of picture 0, where MaxSlicesPerPicture, MaxLumaPs and MaxLumaSr are the values specified in Table A.1 and Table A.2, respectively, that apply to AU 0.
  d) The difference between consecutive CPB removal times of AUs n and n−1 (with n greater than 0) shall satisfy the constraint that the number of slices in each picture in AU n is less than or equal to Min((Max(1, MaxSlicesPerPicture*MaxLumaSr/MaxLumaPs*(AuCpbRemovalTime[n]−AuCpbRemovalTime[n−1])), MaxSlicesPerPicture), where MaxSlicesPerPicture, MaxLumaPs and MaxLumaSr are the values specified in Table A.1 and Table A.2 that apply to AU n.
  e) For the VCL HRD parameters, BitRate[Htid][i] shall be less than or equal to BrVclFactor*MaxBR for at least one value of i in the range of 0 to hrd_cpb_cnt_minus1, inclusive, where BitRate[Htid][i] is specified in clause 7.4.6.3 based on parameters selected as specified in clause C.1 and MaxBR is specified in Table A.2 in units of BrVclFactor bits/s.
  f) For the NAL HRD parameters, BitRate[Htid][i] shall be less than or equal to BrNalFactor*MaxBR for at least one value of i in the range of 0 to hrd_cpb_cnt_minus1, inclusive, where BitRate[Htid][i] is specified in clause 7.4.6.3 based on parameters selected as specified in clause C.1 and MaxBR is specified in Table A.2 in units of BrNalFactor bits/s.
  g) The sum of the NumBytesInNalUnit variables for AU 0 shall be less than or equal to FormatCapabilityFactor*(Max(AuSizeMaxInSamplesY[0], fR*MaxLumaSr)+MaxLumaSr*(AuCpbRemovalTime[0]−AuNominalRemovalTime[0]))÷MinCr, where MaxLumaSr and FormatCapabilityFactor are the values specified in Table A.2 and Table A.3, respectively, that apply to AU 0.
  h) The sum of the NumBytesInNalUnit variables for AU n (with n greater than 0) shall be less than or equal to FormatCapabilityFactor*MaxLumaSr*(AuCpbRemovalTim[n]−AuCpbRemovalTime[n−1]) ÷MinCr, where MaxLumaSr and FormatCapabilityFactor are the values specified in Table A.2 and Table A.3 respectively, that apply to AU n.
  i) The removal time of AU 0 shall satisfy the constraint that the number of tiles in each picture in AU 0 is less than or equal to Min(Max(1, MaxTileCols*MaxTileRows*120*(AuCpbRemovalTime[0]−AuNominalRemovalTime[0])+ MaxTileCols*MaxTileRows*AuSizeMaxInSamplesY[0]/MaxLumaPs), MaxTileCols*MaxTileRows), where MaxTileCols and MaxTileRows are the values specified in Table A.1 that apply to AU 0.
  j) The difference between consecutive CPB removal times of AUs n and n−1 (with n greater than 0) shall satisfy the constraint that the number of tiles in each picture in AU n is less than or equal to Min(Max(1, MaxTileCols*MaxTileRows*120*(AuCpbRemovalTime[n]−AuCpbRemovalTime[n−1])), MaxTileCols*MaxTileRows), where MaxTileCols and MaxTileRows are the values specified in Table A.1 that apply to AU n.

TABLE A.2

Tier and level limits for the video profiles

| Level | Max luma sample rate MaxLumaSr (samples/sec) | Max bit rate MaxBR (BrVclFactor or BrNalFactor bits/s) Main tier | Max bit rate MaxBR (BrVclFactor or BrNalFactor bits/s) High tier | Min compression ratio MinCrBase Main tier | Min compression ratio MinCrBase High tier |
|---|---|---|---|---|---|
| 1 | 552 960 | 128 | — | 2 | 2 |
| 2 | 3 686 400 | 1 500 | — | 2 | 2 |
| 2.1 | 7 372 800 | 3 000 | — | 2 | 2 |
| 3 | 16 588 800 | 6 000 | — | 2 | 2 |
| 3.1 | 33 177 600 | 10 000 | — | 2 | 2 |
| 4 | 66 846 720 | 12 000 | 30 000 | 4 | 4 |
| 4.1 | 133 693 440 | 20 000 | 50 000 | 4 | 4 |
| 5 | 267 386 880 | 25 000 | 100 000 | 6 | 4 |
| 5.1 | 534 773 760 | 40 000 | 160 000 | 8 | 4 |
| 5.2 | 1 069 547 520 | 60 000 | 240 000 | 8 | 4 |
| 6 | 1 069 547 520 | 60 000 | 240 000 | 8 | 4 |
| 6.1 | 2 139 095 040 | 120 000 | 480 000 | 8 | 4 |
| 6.2 | 4 278 190 080 | 240 000 | 800 000 | 8 | 4 |

TABLE A.3

Specification of CpbVclFactor, CpbNalFactor, FormatCapabilityFactor and MinCrScaleFactor

| Profile | CpbVclFactor | CpbNalFactor | FormatCapabilityFactor | MinCrScaleFactor |
|---|---|---|---|---|
| Main 10 | 1 000 | 1 100 | 1.875 | 1.00 |
| Main 4:4:4 10 | 2 500 | 2 750 | 3.750 | 0.75 |
| Main 10 Still Picture | 1 000 | 1 100 | 1.875 | 1.00 |
| Main 4:4:4 10 Still Picture | 2 500 | 2 750 | 3.750 | 0.75 |

3.6. Existing VVC Bitstream Conformance Definition

In the latest VVC draft text in WET-S0152-v5, the bitstream conformance definition is as follows.

A.4 Bitstream Conformance

A bitstream of coded data conforming to this Specification shall fulfil all requirements specified in this clause.

The bitstream shall be constructed according to the syntax, semantics and constraints specified in this Specification outside of this annex.

The first coded picture in a bitstream shall be an IRAP picture (i.e., an Instantaneous Decoding Refresh (IDR) picture or a Clean Random Access (CRA) picture) or a Gradual Decoding Refresh (GDR) picture. The bitstream is tested by the HRD for conformance as specified in clause C.1.

Let currPicLayerId be equal to the nuh_layer_id of the current picture.

For each current picture, let the variables maxPicOrderCnt and minPicOrderCnt be set equal to the maximum and the minimum, respectively, of the PicOrderCntVal values of the following pictures with nuh_layer_id equal to currPicLayerId:

The current picture.

The previous picture in decoding order that has TemporalId and ph_non_ref_pic_flag both equal to 0 and is not a Random Access Skipped Leading (RASL) or Random Access Decodable Leading (RADL) picture.

The Short Term Reference Pictures (STRPs) referred to by all entries in RefPicList[0] and all entries in RefPicList[1] of the current picture.

All pictures n that have PictureOutputFlag equal to 1, AuCpbRemovalTime[n] less than AuCpbRemovalTime[currPic] and DpbOutputTime[n] greater than or equal to AuCpbRemovalTime[currPic], where currPic is the current picture.

1. All of the following conditions shall be fulfilled for each of the bitstream conformance tests:
2. For each AU n, with n greater than 0, associated with a Buffering Period (BP) Supplemental Enhancement Information (SEI) message, let the variable deltaTime90k[n] be specified as follows:

deltaTime90k[$n$]=90000*(AuNominalRemovalTime[$n$]−AuFinalArrivalTime[$n$−1])  (C.17)

The value of InitCpbRemovalDelay[Htid][ScIdx] is constrained as follows:
  If cbr_flag[ScIdx] is equal to 0, the following condition shall be true:

InitCpbRemovalDelay[Htid][ScIdx]<=Ceil(deltaTime90k[$n$])  (C.18)

Otherwise (cbr_flag[ScIdx] is equal to 1), the following condition shall be true:

Floor(deltaTime90k[$n$])<=InitCpbRemovalDelay[Htid][ScIdx]<=Ceil(deltaTime90k[$n$])  (C.19)

NOTE 1—The exact number of bits in the CPB at the removal time of each AU or Decoding Unit (DU) may depend on which BP SEI message is selected to initialize the HRD. Encoders must take this into account to ensure that all specified constraints must be obeyed regardless of which BP SEI message is selected to initialize the HRD, as the HRD may be initialized at any one of the BP SEI messages.

3. A CPB overflow is specified as the condition in which the total number of bits in the CPB is greater than the CPB size. The CPB shall never overflow.
4. When low_delay_hrd_flag[Htid] is equal to 0, the CPB shall never underflow. A CPB underflow is specified as follows:
    If DecodingUnitHrdFlag is equal to 0, a CPB underflow is specified as the condition in which the nominal CPB removal time of AU n AuNominalRemovalTime[n] is less than the final CPB arrival time of AU n AuFinalArrivalTime[n] for at least one value of n.
    Otherwise (DecodingUnitHrdFlag is equal to 1), a CPB underflow is specified as the condition in which the nominal CPB removal time of DU m DuNominalRemovalTime[m] is less than the final CPB arrival time of DU m DuFinalArrivalTime[m] for at least one value of m.
5. When DecodingUnitHrdFlag is equal to 1, low_delay_hrd_flag[Htid] is equal to 1 and the nominal removal time of a DU m of AU n is less than the final CPB arrival time of DU m (i.e., DuNominalRemovalTime[m]<DuFinalArrivalTime[m]), the nominal removal time of AU n shall be less than the final CPB arrival time of AU n (i.e., AuNominalRemovalTime[n]<AuFinalArrivalTime[n]).
6. The nominal removal times of AUs from the CPB (starting from the second AU in decoding order) shall satisfy the constraints on AuNominalRemovalTime[n] and AuCpbRemovalTime[n] expressed in clauses A.4.1 and A.4.2.
7. For each current picture, after invocation of the process for removal of pictures from the DPB as specified in clause C.3.2, the number of decoded pictures in the DPB, including all pictures n that are marked as "used for reference", or that have PictureOutputFlag equal to 1 and CpbRemovalTime[n] less than CpbRemovalTime[currPic], where currPic is the current picture, shall be less than or equal to max_dec_pic_buffering_minus1[Htid].
8. All reference pictures shall be present in the DPB when needed for prediction. Each picture that has PictureOutputFlag equal to 1 shall be present in the DPB at its DPB output time unless it is removed from the DPB before its output time by one of the processes specified in clause C.3.

9. For each current picture that is not a Coded Layer Video Sequence (CLVS) Start (CLVSS) picture, the value of maxPicOrderCnt−minPicOrderCnt shall be less than MaxPicOrderCntLsb/2.
10. The value of DpbOutputInterval[n] as given by Equation C.16, which is the difference between the output times of a picture and the first picture following it in output order and having PictureOutputFlag equal to 1, shall satisfy the constraint expressed in clause A.4.1 for the profile, tier and level specified in the bitstream using the decoding process specified in clauses 2 through 9.
11. For each current picture, when bp_du_cpb_params_in_pic_timing_sei_flag is equal to 1, let tmpCpbRemovalDelaySum be derived as follows:

tmpCpbRemovalDelaySum=0 for (*i*=0;*i*<pt_num_decoding_units_minus1;*i*++)     (C.20)

tmpCpbRemovalDelaySum+=pt_du_cpb_removal_delay_increment_minus1[*i*][Htid]+1

The value of ClockSubTick*tmpCpbRemovalDelaySum shall be equal to the difference between the nominal CPB removal time of the current AU and the nominal CPB removal time of the first DU in the current AU in decoding order.
12. For any two pictures m and n in the same CVS, when DpbOutputTime[m] is greater than DpbOutputTime[n], the PicOrderCntVal of picture m shall be greater than the PicOrderCntVal of picture n.
    NOTE 2—All pictures of an earlier CVS in decoding order that are output are output before any pictures of a later CVS in decoding order. Within any particular CVS, the pictures that are output are output in increasing PicOrderCntVal order.
13. The DPB output times derived for all pictures in any particular AU shall be the same.

4. Technical Problems Solved by Disclosed Technical Solutions

The existing VVC design for level definitions has the following problems:
1) The definitions of the two level limits on the relationship between the CPB removal times for AU 0 and for AU n (n>0) and the number of slices, i.e., items c and d in clause A.4.2 (Profile-specific level limits), are based on MaxSlicesPerPicture and the maximum picture size. However, MaxSlicesPerPicture is defined as a picture-level limit, while the CPB removal times are AU-level parameters.
2) The definitions of the two level limits on the relationship between the CPB removal times for AU 0 and for AU n (n>0) and the number of tiles, i.e., items i and j in clause A.4.2 (Profile-specific level limits), are based on MaxTileCols*MaxTileRows and the maximum AU size. However, similarly as above, MaxTileCols and MaxTileRows are defined as a picture-level limits, while the CPB removal times are AU-level parameters.
3) The 6th constraint in cause C.4 (Bitstream conformance) is as follows:
    For each current picture, after invocation of the process for removal of pictures from the DPB as specified in clause C.3.2, the number of decoded pictures in the DPB, including all pictures n that are marked as "used for reference", or that have PictureOutputFlag equal to 1 and CpbRemovalTime[n] less than CpbRemovalTime[currPic], where currPic is the current picture, shall be less than or equal to max_dec_pic_buffering_minus1[Htid].

The part "CpbRemovalTime[n] less than CpbRemovalTime[currPic]" describes a condition that the decoding time of a decoded picture in the DPB is less than the decoding time of the current picture. However, all decoded pictures in the DPB are always decoded earlier than decoding of the current picture and thus CpbRemovalTime[n] in the context is always less than CpbRemovalTime[currPic].

5. Examples of Solutions and Embodiments

To solve the above problems, and others, methods as summarized below are disclosed. The items should be considered as examples to explain the general concepts and should not be interpreted in a narrow way. Furthermore, these items can be applied individually or combined in any manner.

1) To solve the first problem, change the definitions of the two level limits on the relationship between the CPB removal times for AU 0 and for AU n (n>0) and the number of slices i.e., items c and d in clause A.4.2 of the latest VVC draft, from being based on MaxSlicesPerPicture and the maximum picture size to be based on MaxSlicesPerPicture*(the number of pictures in the AU) and the maximum AU size.

2) To solve the second problem, change the definitions of the two level limits on the relationship between the CPB removal times for AU 0 and for AU n (n>0) and the number of tiles i.e., items i and j in clause A.4.2 of the latest VVC draft, from being based on MaxTileCols*MaxTileRows and the maximum AU size to be based on MaxTileCols*MaxTileRows*(the number of pictures in the AU) and the maximum AU size.

3) To solve the third problem, change the 6th constraint in clause C.4 of the latest VVC draft to impose a constraint on the number of decoded pictures stored in the DPB that are marked as "used for reference", have PictureOutputFlag equal to 1, and have output time later than the decoding time of the current picture.
    a. In one example, in the 6th constraint in clause C.4 of the latest VVC draft, change "or that have PictureOutputFlag equal to 1 and CpbRemovalTime[n] less than CpbRemovalTime[currPic]" to be "or have PictureOutputFlag equal to 1 and DpbOutputTime[n] greater than CpbRemovalTime[currPic]".

6. Embodiments

Below are some example embodiments for some of the aspects summarized above in this Section, which can be applied to the VVC specification. The changed texts are based on the latest VVC text in JVET-S0152-v5. Most relevant parts that have been added or modified are bolded, underlined and italicized, e.g., "using A ___and B___", and some of the deleted parts are italicized and enclosed with double bolded brackets, e.g., "based on [[A and]] B". There may be some other changes that are editorial in nature and thus not highlighted.

6.1. Embodiment 1

This embodiment is for items 1 to 3 and their sub-items.
A.4.2 Profile-Specific Level Limits The following is specified for expressing the constraints in this annex:

Let the variable fR be set equal to 1÷300.
The variable HbrFactor is defined as follows:
If the bitstream is indicated to conform to the Main 10 profile or the Main 4:4:4 10 profile, HbrFactor is set equal to 1.

The variable BrVclFactor, which represents the VCL bit rate scale factor, is set equal to CpbVclFactor*HbrFactor.

The variable BrNalFactor, which represents the NAL bit rate scale factor, is set equal to CpbNalFactor*HbrFactor.

The variable MinCr is set equal to MinCrBase*MinCrScaleFactor÷HbrFactor.

When the specified level is not level 15.5, the value of max_dec_pic_buffering_minus1[Htid]+1 shall be less than or equal to MaxDpbSize, which is derived as follows:

```
if( PicSizeMaxInSamplesY <= ( MaxLumaPs >> 2 ) )
    MaxDpbSize = Min( 4 * maxDpbPicBuf, 16 )
else if( PicSizeMaxInSamplesY <= ( MaxLumaPs >> 1 ) )
    MaxDpbSize = Min( 2 * maxDpbPicBuf, 16 ) (A.1)
else if( PicSizeMaxInSamplesY <= ( ( 3 * MaxLumaPs) >> 2 ) )
    MaxDpbSize = Min( ( 4 * maxDpbPicBuf ) / 3, 16)
else
    MaxDpbSize = maxDpbPicBuf
``` where MaxLumaPs is specified in Table A.1, maxDpbPicBuf is equal to 8, and max_dec_pic_buffering_minus1[Htid] is found in or derived from the applicable dpb_parameters( ) syntax structure.

Let _numPics[ n ]_ [[numDecPics]] be the number of pictures in AU n. The variable AuSizeMaxInSamplesY[n] is set equal to PicSizeMaxInSamplesY*_numPics[ n ]_ [[num-DecPics]]. Bitstreams conforming to the Main 10 and Main 4:4:4 10 profile at a specified tier and level shall obey the following constraints for each bitstream conformance test as specified in Annex C:

k) The nominal removal time of AU n (with n greater than 0) from the CPB, as specified in clause C.2.3, shall satisfy the constraint that AuNominalRemovalTime[n]−AuCpbRemovalTime[n−1] is greater than or equal to Max(AuSizeMaxInSamplesY[n−1] MaxLumaSr, fR), where MaxLumaSr is the value specified in Table A.2 that applies to AU n−1.

l) The difference between consecutive output times of pictures of different AUs from the DPB, as specified in clause C.3.3, shall satisfy the constraint that DpbOutputInterval[n] is greater than or equal to Max(AuSizeMaxInSamplesY[n]÷MaxLumaSr, fR), where MaxLumaSr is the value specified in Table A.2 for AU n, provided that AU n has a picture that is output and AU n is not the last AU of the bitstream that has a picture that is output.

m) The removal time of AU 0 shall satisfy the constraint that the number of slices in [[each picture in]]AU 0 is less than or equal to Min(Max(1, MaxSlicesPerPicture *_numPics[ 0 ]_ *MaxLumaSr/MaxLumaPs*(AuCpbRemovalTime[0]−AuNominalRemovalTime[0])+ MaxSlicesPerPicture *_numPics[ 0 ]_ * _AuSizeMaxInSamplesY[ 0 ]_ [[PicSizeMaxInSamplesY]]/MaxLumaPs), MaxSlicesPerPicture *_numPics[ 0 ]_ ), [[for the value of PicSizeMaxInSamplesY of picture 0,]] where MaxSlicesPerPicture, MaxLumaPs and MaxLumaSr are the values specified in Table A.1 and Table A.2, respectively, that apply to AU 0.

n) The difference between consecutive CPB removal times of AUs n and n−1 (with n greater than 0) shall satisfy the constraint that the number of slices in [[each picture in]] AU n is less than or equal to Min((Max(1, MaxSlicesPerPicture* _numPics[ n ]_ * MaxLumaSr/ MaxLumaPs*(AuCpbRemovalTime[n]−AuCpbRemovalTime[n−1])), MaxSlicesPerPicture* _numPics[ n ]_ ), where MaxSlicesPerPicture, MaxLumaPs and MaxLumaSr are the values specified in Table A.1 and Table A.2 that apply to AU n.

o) For the VCL HRD parameters, BitRate[Htid][i] shall be less than or equal to BrVclFactor*MaxBR for at least one value of i in the range of 0 to hrd_cpb_cnt_minus1, inclusive, where BitRate[Htid][i] is specified in clause 7.4.6.3 based on parameters selected as specified in clause C.1 and MaxBR is specified in Table A.2 in units of BrVclFactor bits/s.

p) For the NAL HRD parameters, BitRate[Htid][i] shall be less than or equal to BrNalFactor*MaxBR for at least one value of i in the range of 0 to hrd_cpb_cnt_minus1, inclusive, where BitRate[Htid][i] is specified in clause 7.4.6.3 based on parameters selected as specified in clause C.1 and MaxBR is specified in Table A.2 in units of BrNalFactor bits/s.

q) The sum of the NumBytesInNalUnit variables for AU 0 shall be less than or equal to FormatCapabilityFactor*(Max(AuSizeMaxInSamplesY[0], fR*MaxLumaSr)+MaxLumaSr*(AuCpbRemovalTime[0]−AuNominalRemovalTime[0]))÷MinCr, where MaxLumaSr and FormatCapabilityFactor are the values specified in Table A.2 and Table A.3, respectively, that apply to AU 0.

r) The sum of the NumBytesInNalUnit variables for AU n (with n greater than 0) shall be less than or equal to FormatCapabilityFactor*MaxLumaSr*(AuCpbRemovalTime[n]−AuCpbRemovalTime[n−1])÷MinCr, where MaxLumaSr and FormatCapabilityFactor are the values specified in Table A.2 and Table A.3 respectively, that apply to AU n.

s) The removal time of AU 0 shall satisfy the constraint that the number of tiles [[in each picture]]in AU 0 is less than or equal to Min(Max(1, MaxTileCols*MaxTileRows *_numPics[ 0 ]_ *120*(AuCpbRemovalTime[0]−AuNominalRemovalTime[0])+MaxTileCols*MaxTileRows *_numPics[ 0 ]_ *AuSizeMaxInSamplesY[0]/MaxLumaPs), MaxTileCols*MaxTileRows *_numPics[ 0 ]_ ), where MaxTileCols and MaxTileRows are the values specified in Table A.1 that apply to AU 0.

t) The difference between consecutive CPB removal times of AUs n and n−1 (with n greater than 0) shall satisfy the constraint that the number of tiles [[in each picture]] in AU n is less than or equal to Min(Max(1, MaxTileCols*MaxTileRows *_numPics[ n ]_ *120*(AuCpbRemovalTime[n]−AuCpbRemovalTime[n−1])), MaxTileCols*MaxTileRows* *_numPics[ n ]_ ), where MaxTileCols and MaxTileRows are the values specified in Table A.1 that apply to AU n.

C.4 Bitstream Conformance

6. For each current picture, after invocation of the process for removal of pictures from the DPB as specified in clause C.3.2, the number of decoded pictures in the DPB, including all pictures n that are marked as "used for reference", or *have Picture OutputFlag equal to 1 and DpbOutputTime[ n ] greater than CpbRemovalTime [ currPic ]*[[ that have PictureOutputFlag equal to 1 and CpbRemovalTime[n] less than CpbRemovalTime[currPic]]], where currPic is the current picture, shall be less than or equal to max_dec_pic_buffering_minus1[Htid].

FIG. 1 is a block diagram showing an example video processing system 1000 in which various techniques disclosed herein may be implemented. Various implementations may include some or all of the components of the system 1000. The system 1000 may include input 1002 for receiving video content. The video content may be received in a raw or uncompressed format, e.g., 8 or 10 bit multi-component pixel values, or may be in a compressed or encoded format. The input 1002 may represent a network interface, a peripheral bus interface, or a storage interface. Examples of network interface include wired interfaces such as Ethernet, passive optical network (PON), etc. and wireless interfaces such as wireless fidelity (Wi-Fi) or cellular interfaces.

The system 1000 may include a coding component 1004 that may implement the various coding or encoding methods described in the present disclosure. The coding component 1004 may reduce the average bitrate of video from the input 1002 to the output of the coding component 1004 to produce a coded representation of the video. The coding techniques are therefore sometimes called video compression or video transcoding techniques. The output of the coding component 1004 may be either stored, or transmitted via a communication connected, as represented by the component 1006. The stored or communicated bitstream (or coded) representation of the video received at the input 1002 may be used by the component 1008 for generating pixel values or displayable video that is sent to a display interface 1010. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present disclosure may be embodied in various electronic devices such as mobile phones, laptops, smartphones or other devices that are capable of performing digital data processing and/or video display.

Figure 2:
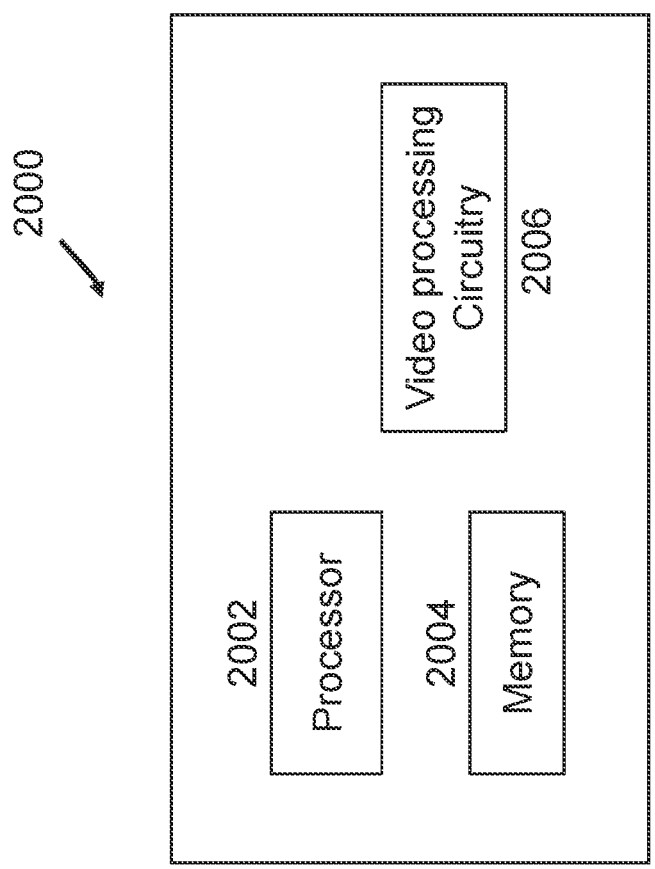
FIG. 2 is a block diagram of an example hardware platform used for video processing.

FIG. 2 is a block diagram of a video processing apparatus 2000. The apparatus 2000 may be used to implement one or more of the methods described herein. The apparatus 2000 may be embodied in a smartphone, tablet, computer, Internet of Things (IoT) receiver, and so on. The apparatus 2000 may include one or more processors 2002, one or more memories 2004 and video processing hardware 2006. The processor(s) 2002 may be configured to implement one or more methods described in the present disclosure (e.g., in FIGS. 6-9). The memory (memories) 2004 may be used for storing data and code used for implementing the methods and techniques described herein. The video processing hardware 2006 may be used to implement, in hardware circuitry, some techniques described in the present disclosure. In some embodiments, the hardware 2006 may be partly or entirely in the one or more processors 2002, e.g., a graphics processor.

Figure 3:
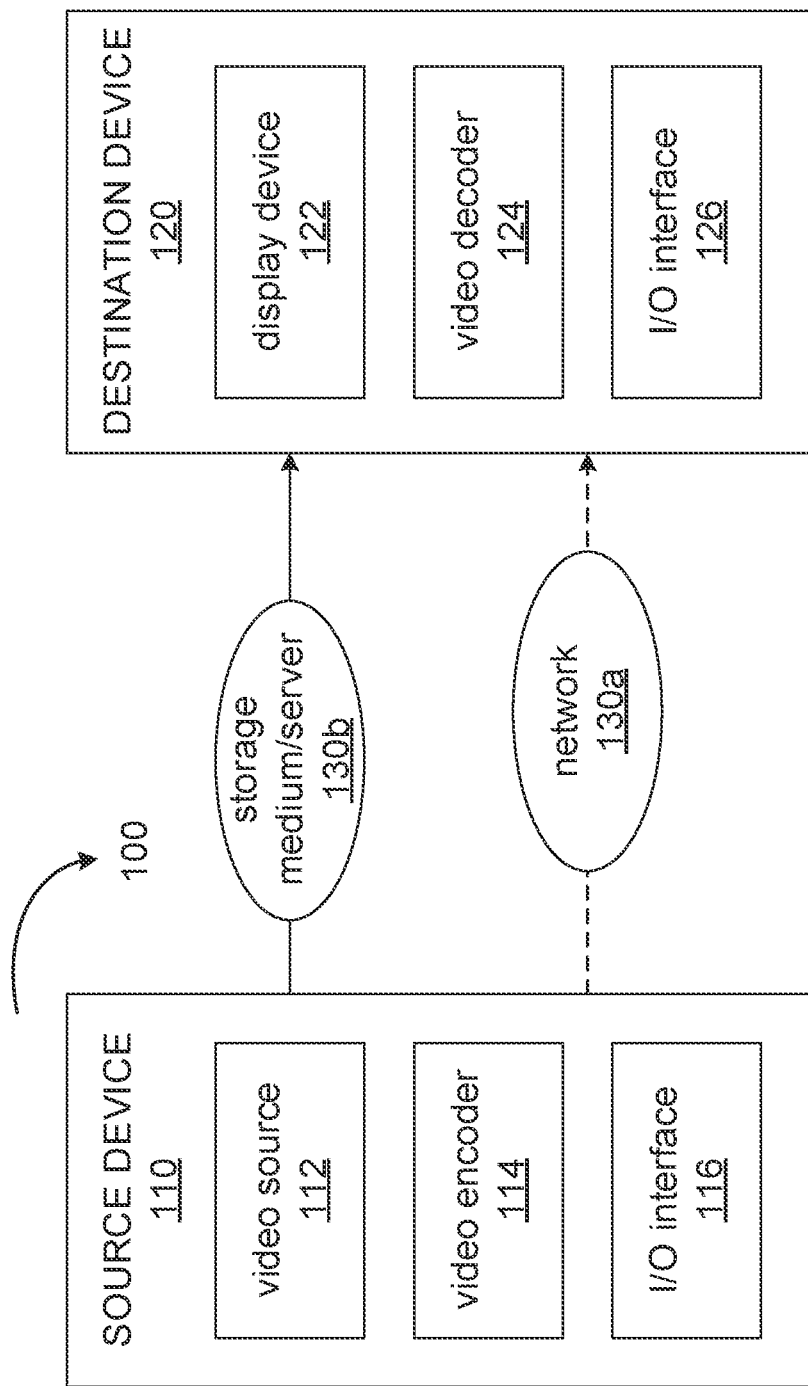
FIG. 3 is a block diagram that illustrates an example video coding system that can implement some embodiments of the present disclosure.

FIG. 3 is a block diagram that illustrates an example video coding system 100 that may utilize the techniques of this disclosure. As shown in FIG. 3, video coding system 100 may include a source device 110 and a destination device 120. Source device 110 generates encoded video data which may be referred to as a video encoding device. Destination device 120 may decode the encoded video data generated by source device 110 which may be referred to as a video decoding device. Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVC) standard and other current and/or further standards.

Figure 4:
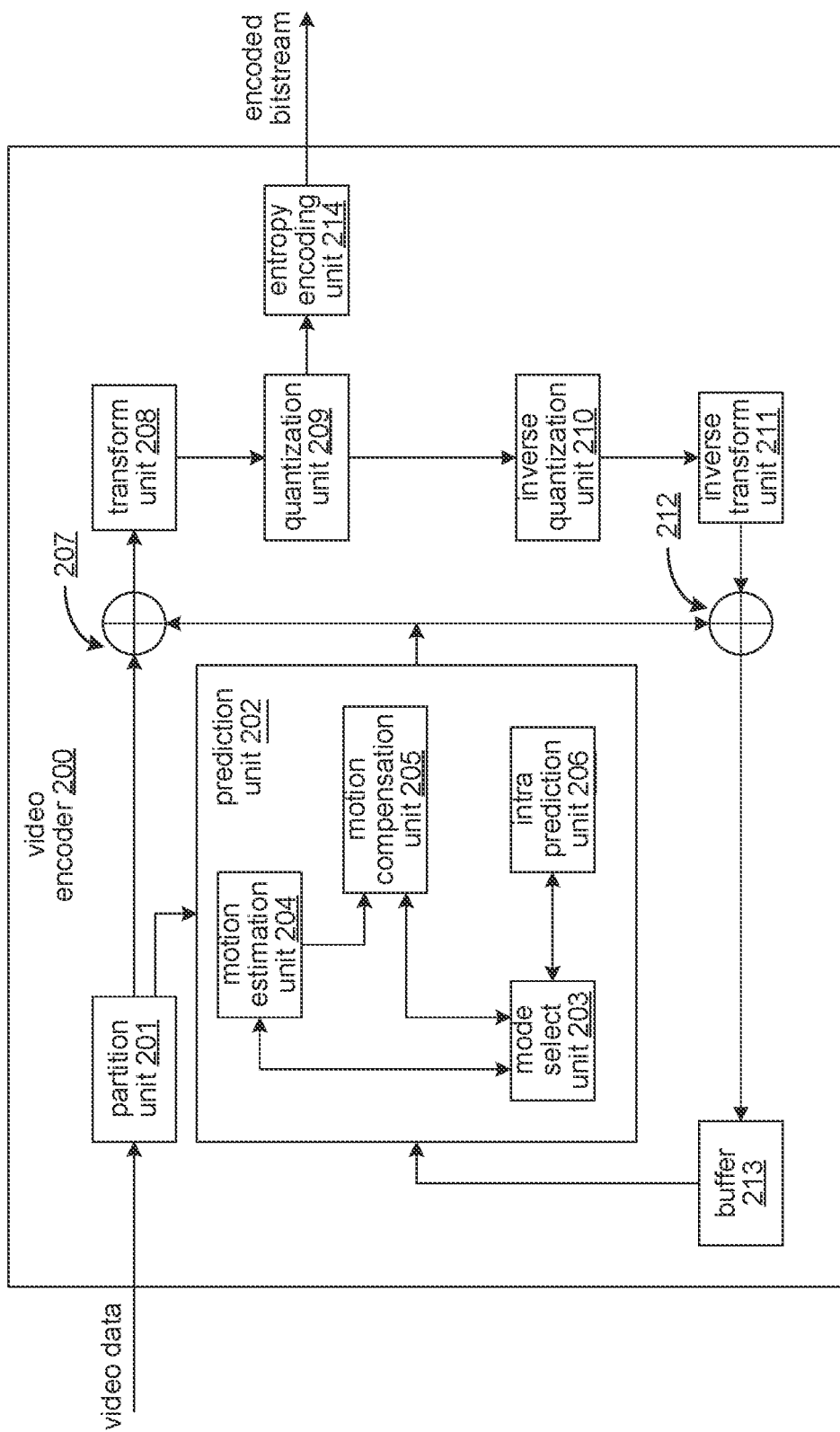
FIG. 4 is a block diagram that illustrates an example of an encoder that can implement some embodiments of the present disclosure.

FIG. 4 is a block diagram illustrating an example of video encoder 200, which may be video encoder 114 in the system 100 illustrated in FIG. 3.

Video encoder 200 may be configured to perform any or all of the techniques of this disclosure. In the example of FIG. 4, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a prediction unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, prediction unit 202 may include an intra block copy (IBC) unit. The IBC unit may perform prediction in an IBC mode in which at least one reference picture is a picture where the current video block is located.

Furthermore, some components, such as motion estimation unit 204 and motion compensation unit 205 may be highly integrated, but are represented in the example of FIG. 4 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter prediction (CIIP) mode in which the prediction is based on an inter prediction signal and an intra prediction signal. Mode select unit 203 may also select a resolution for a motion vector (e.g., a sub-pixel or integer pixel precision) for the block in the case of inter-prediction.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector prediction (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the prediction unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 5:
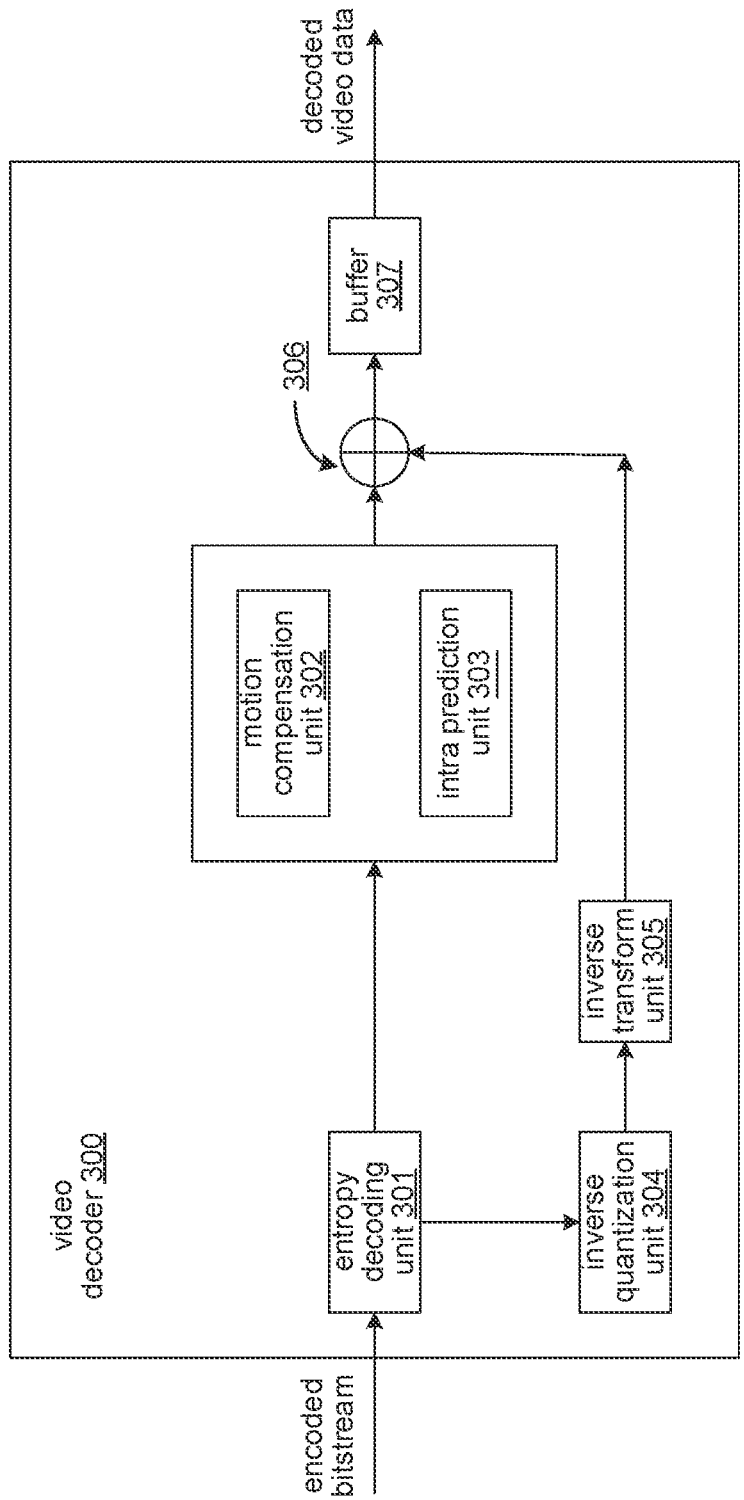
FIG. 5 is a block diagram that illustrates an example of a decoder that can implement some embodiments of the present disclosure.

FIG. 5 is a block diagram illustrating an example of video decoder 300 which may be video decoder 124 in the system 100 illustrated in FIG. 3.

The video decoder 300 may be configured to perform any or all of the techniques of this disclosure. In the example of FIG. 5, the video decoder 300 includes a plurality of functional components. The techniques described in this disclosure may be shared among the various components of the video decoder 300. In some examples, a processor may be configured to perform any or all of the techniques described in this disclosure.

In the example of FIG. 5, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 4).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 20 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 304 inverse quantizes, i.e., de-quantizes, the quantized video block coefficients provided in the bitstream and decoded by entropy decoding unit 301. Inverse transform unit 305 applies an inverse transform.

Reconstruction unit 306 may sum the residual blocks with the corresponding prediction blocks generated by motion compensation unit 302 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra prediction and also produces decoded video for presentation on a display device.

Figure 6:
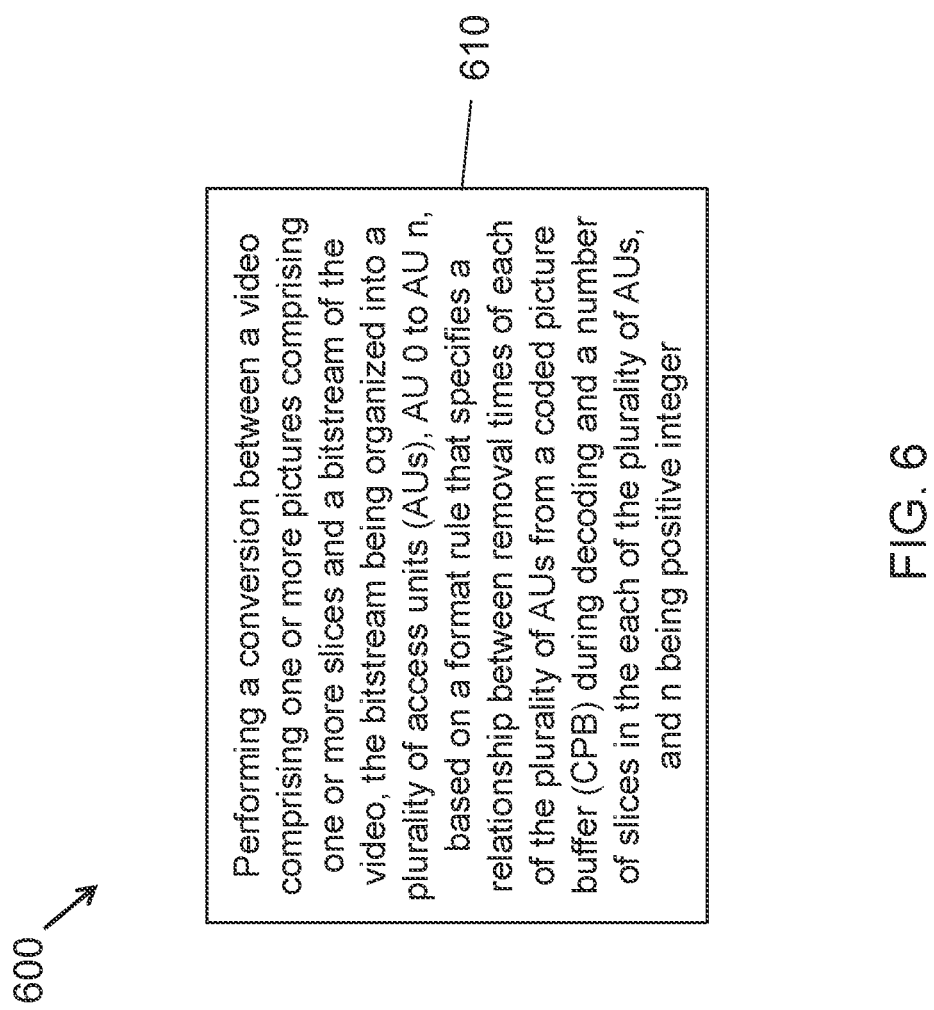
FIGS. 6-8 show flowcharts for example methods of video processing.
Figure 7:
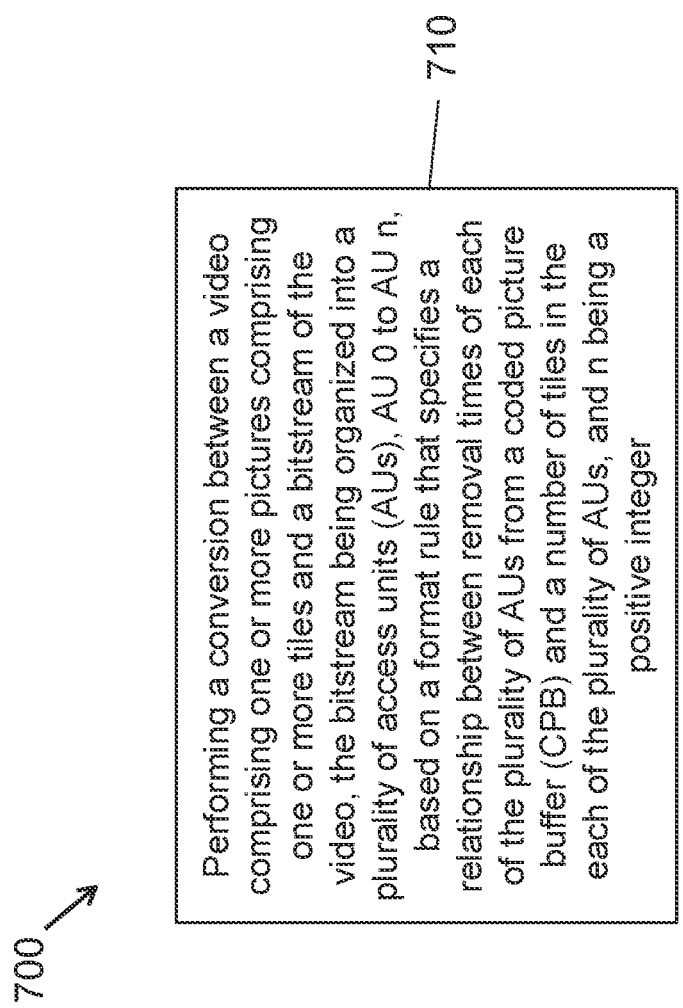
Figure 8:
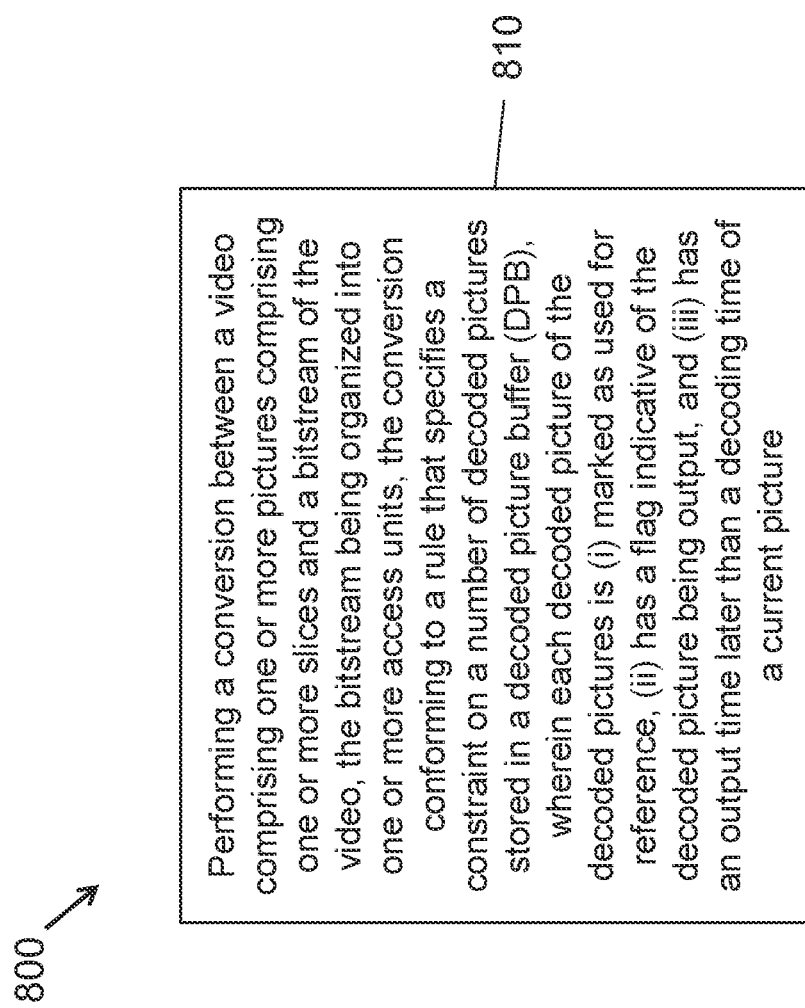

FIGS. 6-8 show example methods that can implement the technical solution described above in, for example, the embodiments show in FIGS. 1-5.

FIG. 6 shows a flowchart for an example method 600 of video processing. The method 600 includes, at operation 610, performing a conversion between a video comprising one or more pictures comprising one or more slices and a bitstream of the video, the bitstream being organized into a plurality of access units (AUs), AU 0 to AU n, based on a format rule that specifies a relationship between removal times of each of the plurality of AUs from a coded picture buffer (CPB) during decoding and a number of slices in the each of the plurality of AUs, and n being positive integer.

FIG. 7 shows a flowchart for an example method 700 of video processing. The method 700 includes, at operation 710, performing a conversion between a video comprising one or more pictures comprising one or more tiles and a bitstream of the video, the bitstream being organized into a plurality of access units (AUs), AU 0 to AU n, based on a format rule that specifies a relationship between removal times of each of the plurality of AUs from a coded picture buffer (CPB) and a number of tiles in the each of the plurality of AUs, and n being a positive integer.

FIG. 8 shows a flowchart for an example method 800 of video processing. The method 800 includes, at operation 810, performing a conversion between a video comprising one or more pictures comprising one or more slices and a bitstream of the video, the bitstream being organized into one or more access units, the conversion conforming to a rule that specifies a constraint on a number of decoded pictures stored in a decoded picture buffer, wherein each decoded picture of the decoded pictures is (i) marked as used for reference, (ii) has a flag indicative of the decoded picture being output, and (iii) has an output time later than a decoding time of a current picture.

A listing of solutions preferred by some embodiments is provided next.

A1. A method of processing video data, comprising performing a conversion between a video comprising one or more pictures comprising one or more slices and a bitstream of the video, wherein the bitstream is organized into a plurality of access units (AUs), AU 0 to AU n, based on a format rule, where n is a positive integer, wherein the format rule specifies a relationship between removal times of each of the plurality of AUs from a coded picture buffer (CPB) during decoding and a number of slices in the each of the plurality of AUs.

A2. The method of solution A1, wherein the relationship is based on (i) a product of a maximum number of slices per picture and a number of pictures in an access unit and (ii) a maximum size of the access unit.

A3. The method of solution A1, wherein the format rule specifies that the removal time of a first access unit, AU 0, of the plurality of access units satisfies a constraint.

A4. The method of solution A3, wherein the constraint specifies that a number of slices in AU 0 is less than or equal to Min(Max(1, MaxSlicesPerAu×MaxLumaSr/MaxLumaPs×(AuCpbRemovalTime[0]−AuNominalRemovalTime[0])+MaxSlicesPerAu×AuSizeMaxInSamplesY[0]/MaxLumaPs), MaxSlicesPerAu), wherein MaxSlicesPerAu is a maximum number of slices per access unit, MaxLumaSr is a maximum luma sample rate, MaxLumaPs is a maximum luma picture size, AuCpbRemovalTime[m] is a CPB removal time of an m-th access unit, AuNominalRemovalTime[m] is a nominal CPB removal time of the m-th access unit, and AuSizeMaxInSamplesY[m] is a maximum size, in luma samples, of a decoded picture that refers to a sequence parameter set (SPS).

A5. The method of solution A4, wherein a value of MaxLumaPs and a value of MaxLumaSr are selected from values corresponding to AU 0.

A6. The method of solution A1, wherein the format rule specifies that a difference between the removal times of two consecutive access units, AU n−1 and AU n, satisfies a constraint.

A7. The method of solution A6, wherein the constraint specifies that a number of slices in AU n is less than or equal to Min((Max(1, MaxSlicesPerAu×MaxLumaSr/MaxLumaPs×(AuCpbRemovalTime[n]−AuCpbRemovalTime[n−1])), MaxSlicesPerAu), wherein MaxSlicesPerAu is a maximum number of slices per access unit, MaxLumaSr is a maximum luma sample rate, MaxLumaPs is a maximum luma picture size, and AuCpbRemovalTime[m] is a CPB removal time of an m-th access unit.

A8. The method of solution A7, wherein a value of MaxSlicesPerAu, a value of MaxLumaPs, and a value of MaxLumaSr are selected from values corresponding to AU n.

A9. A method of processing video data, comprising performing a conversion between a video comprising one or more pictures comprising one or more tiles and a bitstream of the video, wherein the bitstream is organized into a plurality of access units (AUs), AU 0 to AU n, based on a format rule, wherein n is a positive integer, wherein the format rule specifies a relationship between removal times of each of the plurality of AUs from a coded picture buffer (CPB) and a number of tiles in the each of the plurality of AUs.

A10. The method of solution A9, wherein the relationship is based on (i) a product of a maximum number of tile columns per picture (MaxTileCols), a maximum number of tile rows per picture (MaxTileRows), and a number of pictures in an access unit and (ii) a maximum size of the access unit.

A11. The method of solution A9, wherein the format rule specifies that the removal time of a first access unit, AU 0, of the plurality of access units satisfies a constraint.

A12. The method of solution A11, wherein the constraint specifies that a number of tiles in AU 0 is less than or equal to Min(Max(1, MaxTilesPerAu×120×(AuCpbRemovalTime[0]−AuNominalRemovalTime[0])+MaxTilesPerAu×AuSizeMaxInSamplesY[0]/MaxLumaPs), MaxTilesPerAu), wherein MaxTilesPerAu is a maximum number of tiles per access unit, MaxLumaPs is a maximum luma picture size, AuCpbRemovalTime[m] is a CPB removal time of an m-th access unit, AuNominalRemovalTime[m] is a nominal CPB removal time of the m-th access unit, and AuSizeMaxInSamplesY[m] is a maximum size, in luma samples, of a decoded picture that refers to a sequence parameter set (SPS).

A13. The method of solution A12, wherein a value of MaxTilesPerAu is selected from values corresponding to AU 0.

A14. The method of solution A9, wherein the format rule specifies that a difference between the removal times of two consecutive access units, AU n−1 and AU n, satisfies a constraint.

A15. The method of solution A14, wherein the constraint specifies that a number of tiles in AU n is less than or equal to Min(Max(1, MaxTilesPerAu×120×(AuCpbRemovalTime[n]−AuCpbRemovalTime[n−1])), MaxTilesPerAu), wherein MaxTilesPerAu is a maximum number of tiles per access unit and AuCpbRemovalTime[m] is a CPB removal time of an m-th access unit.

A16. The method of solution A15, wherein a value of MaxTilesPerAu is selected from values corresponding to AU n.

A17. The method of any of solutions A1 to A16, wherein the conversion comprises decoding the video from the bitstream.

A18. The method of any of solutions A1 to A16, wherein the conversion comprises encoding the video into the bitstream.

A19. A method of storing a bitstream representing a video to a computer-readable recording medium, comprising generating the bitstream from the video according to a method described in any one or more of solutions A1 to A16, and storing the bitstream in the computer-readable recording medium.

A20. A video processing apparatus comprising a processor configured to implement a method recited in any one or more of solutions A1 to A19.

A21. A computer-readable medium having instructions stored thereon, the instructions, when executed, causing a processor to implement a method recited in one or more of solutions A1 to A19.

A22. A computer readable medium that stores the bitstream generated according to any one or more of solutions A1 to 19.

A23. A video processing apparatus for storing a bitstream, wherein the video processing apparatus is configured to implement a method recited in any one or more of solutions A1 to A19.

Another listing of solutions preferred by some embodiments is provided next.

B1. A method of processing video data, comprising performing a conversion between a video comprising one or more pictures comprising one or more slices and a bitstream of the video, wherein the conversion conforms to a rule, wherein the bitstream is organized into one or more access units, wherein the rule specifies a constraint on a number of decoded pictures stored in a decoded picture buffer (DPB), wherein each decoded picture of the decoded pictures is (i) marked as used for reference, (ii) has a flag indicative of the decoded picture being output, and (iii) has an output time later than a decoding time of a current picture.

B2. The method of solution B1, wherein the number of decoded pictures is less than or equal to a maximum required size of the DPB in units of picture storage buffers minus 1.

B3. The method of solution B1, wherein the flag is PictureOutputFlag, the output time of an m-th picture is DpbOutputTime[m], and the decoding time of the m-th picture is AuCpbRemovalTime[m].

B4. The method of any of solutions B1 to B3, wherein the conversion comprises decoding the video from the bitstream.

B5. The method of any of solutions B1 to B3, wherein the conversion comprises encoding the video into the bitstream.

B6. A method of storing a bitstream representing a video to a computer-readable recording medium, comprising generating the bitstream from the video according to a method described in any one or more of solutions B1 to B3, and storing the bitstream in the computer-readable recording medium.

B7. A video processing apparatus comprising a processor configured to implement a method recited in any one or more of solutions B1 to B6.

B8. A computer-readable medium having instructions stored thereon, the instructions, when executed, causing a processor to implement a method recited in one or more of solutions B1 to B6.

B9. A computer readable medium that stores the bitstream generated according to any one or more of solutions B1 to B6.

B10. A video processing apparatus for storing a bitstream, wherein the video processing apparatus is configured to implement a method recited in any one or more of solutions B1 to B6.

Yet another listing of solutions preferred by some embodiments is provided next.

P1. A video processing method, comprising performing a conversion between a video comprising one or more pictures comprising one or more slices and a bitstream representation of the video, wherein the bitstream representation is organized into one or more access units according to a format rule, wherein the format rule specifies a relationship between one or more syntax elements in the bitstream representation and removal times for one or more access units from a coded picture buffer.

P2. The method of solution P1, wherein the rule specifies two level limits for a relationship between the removal times based on a value of a product of maximum number of slices per picture and a number of pictures in the access unit, and a maximum allowed size of the access unit.

P3. The method of solution P1, wherein the rule specifies two level limits for a relationship between the removal times based on a first parameter whose value is MaxTileCols*MaxTileRows*(a number of pictures in an access unit) and a second parameter whose value is a maximum allowed size of the one or more access units.

P4. A video processing method, comprising performing a conversion between a video comprising one or more pictures comprising one or more slices and a bitstream representation of the video, wherein the conversion conforms to a rule wherein the bitstream representation is organized into one or more access units, wherein the rule specifies a constraint on a number of decoded pictures stored in a decoded picture buffer that are marked as used for reference and have a PictureOutputFlag equal to 1, and have output time later than the decoding time of the current picture.

P5. The method of any of solutions P1 to P4, wherein the performing the conversion comprises encoding the video to generate the coded representation.

P6. The method of any of solutions P1 to P4, wherein the performing the conversion comprises parsing and decoding the coded representation to generate the video.

P7. A video decoding apparatus comprising a processor configured to implement a method recited in one or more of solutions P1 to P6.

P8. A video encoding apparatus comprising a processor configured to implement a method recited in one or more of solutions P1 to P6.

P9. A computer program product having computer code stored thereon, the code, when executed by a processor, causes the processor to implement a method recited in any of solutions P1 to P6.

In the present disclosure, the term "video processing" may refer to video encoding, video decoding, video compression or video decompression. For example, video compression algorithms may be applied during conversion from pixel representation of a video to a corresponding bitstream representation or vice versa. The bitstream representation (or simply, the bitstream) of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

The disclosed and other solutions, examples, embodiments, modules and the functional operations described in this disclosure can be implemented in digital electronic circuitry, or in computer software, firmware, or hardware, including the structures disclosed in this disclosure and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc, read-only memory (CD ROM) and digital versatile disc read-only memory (DVD-ROM) disks. The processor and the memory can be supplemented by, or incorporated in, special purpose logic circuitry.

While the present disclosure contains many specifics, these should not be construed as limitations on the scope of any subject matter or of what may be claimed, but rather as descriptions of features that may be specific to particular embodiments of particular techniques. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

What is claimed is:

1. A method of processing video data, comprising:
   performing a conversion between a video and a bitstream of the video,
   wherein the bitstream is organized into a plurality of access units (AUS), AU 0 to AU n, where n is a positive integer, each AU comprising one or more pictures,
   wherein the conversion is performed according to a first format rule, and
   wherein the first format rule specifies a first constraint related to a removal time of AU 0, and a second constraint related to a difference between consecutive coded picture buffer (CPB) removal times of AUs n and n−1, wherein the first constraint is based on (i) a value equal to a product of a maximum number of slices per picture and a number of pictures in an access unit and (ii) a maximum size of the access unit, and wherein the second constraint is based on a value equal to a product of a maximum number of slices per picture and a number of pictures in an access unit.

2. The method of claim 1, wherein the first constraint specifies that a number of slices in AU 0 is less than or equal to:

$$\text{Min}(\text{Max}(1, \text{MaxSlicesPerAu} \times \text{MaxLumaSr}/\text{MaxLumaPs} \times (\text{AuCpbRemovalTime}[0] - \text{AuNominalRemovalTime}[0]) + \text{MaxSlicesPerAu} \times \text{AuSizeMaxInSamplesY}[0]/\text{MaxLumaPs}), \text{MaxSlicesPerAu}),$$

wherein MaxSlicesPerAu is a maximum number of slices per access unit, MaxLumaSr is a maximum luma sample rate, MaxLumaPs is a maximum luma picture size, AuCpbRemovalTime[m] is a CPB removal time of an m-th access unit, AuNominalRemovalTime[m] is a nominal CPB removal time of the m-th access unit, and AuSizeMaxInSamplesY[m] is a product of a maximum size, in luma samples, of a picture and a number of pictures in an access unit.

3. The method of claim 2, wherein a value of MaxLumaPs and a value of MaxLumaSr are selected from values corresponding to AU 0.

4. The method of claim 1, wherein the second constraint specifies that a number of slices in AU n is less than or equal to:

$$\text{Min}((\text{Max}(1, \text{MaxSlicesPerAu} \times \text{MaxLumaSr}/\text{MaxLumaPs} \times (\text{AuCpbRemovalTime}[n] - \text{AuCpbRemovalTime}[n-1])), \text{MaxSlicesPerAu}),$$

wherein MaxSlicesPerAu is a maximum number of slices per access unit, MaxLumaSr is a maximum luma sample rate, MaxLumaPs is a maximum luma picture size, and AuCpbRemovalTime[m] is a CPB removal time of an m-th access unit.

5. The method of claim 4, wherein a value of MaxSlicesPerAu, a value of MaxLumaPs, and a value of MaxLumaSr are selected from values corresponding to AU n.

6. The method of claim 1, wherein the conversion is performed according to a second format rule, and
   wherein the second format rule specifies a third constraint related to a removal time of AU 0, and a fourth constraint related to a difference between consecutive CPB removal times of AUs n and n−1, wherein the third constraint is based on (i) a value equal to a product of a maximum number of tile columns per picture (MaxTileCols), a maximum number of tile rows per picture (MaxTileRows), and a number of pictures in an access unit and (ii) a maximum size of the access unit, and the fourth constraint is based on a value equal to a product of a maximum number of tile columns per picture (MaxTileCols), a maximum number of tile rows per picture (MaxTileRows), and a number of pictures in an access unit.

7. The method of claim 6, wherein the third constraint specifies that a number of tiles in AU 0 is less than or equal to:

Min(Max(1,MaxTilesPerAu×120×(AuCpbRemovalTime[0]−AuNominalRemovalTime[0])+MaxTilesPerAu×AuSizeMaxInSamplesY[0]/MaxLumaPs),MaxTilesPerAu), wherein MaxTilesPerAu is a maximum number of tiles per access unit, MaxLumaPs is a maximum luma picture size, AuCpbRemovalTime[m] is a CPB removal time of an m-th access unit, AuNominalRemovalTime[m] is a nominal CPB removal time of the m-th access unit, and AuSizeMaxInSamplesY[m] is a product of a maximum size, in luma samples, of a picture and a number of pictures in an access unit.

8. The method of claim 7, wherein a value of MaxTilesPerAu is selected from values corresponding to AU 0.

9. The method of claim 6, wherein the fourth constraint specifies that a number of tiles in AU n is less than or equal to:

Min(Max(1,MaxTilesPerAu×120×(AuCpbRemovalTime[$n$]−AuCpbRemovalTime[$n-1$])),MaxTilesPerAu), wherein MaxTilesPerAu is a maximum number of tiles per access unit and AuCpbRemovalTime[m] is a CPB removal time of an m-th access unit.

10. The method of claim 9, wherein a value of MaxTilesPerAu is selected from values corresponding to AU n.

11. The method of claim 1, wherein the conversion is performed according to a third format rule,
wherein the third format rule specifies a constraint on a number of decoded pictures stored in a decoded picture buffer (DPB), and wherein each decoded picture of the decoded pictures is (i) marked as used for reference, or (ii) has a flag indicative of the decoded picture being output and has an output time later than a decoding time of a current picture.

12. The method of claim 11, wherein the number of decoded pictures is less than or equal to a maximum required size of the DPB in units of picture storage buffers minus 1.

13. The method of claim 11, wherein the flag is PictureOutputFlag, the output time of an m-th picture is DpbOutputTime[m], and the decoding time of the m-th picture is AuCpbRemovalTime[m].

14. The method of claim 11, wherein the output time is a DPB output time and the decoding time is a CPB removal time.

15. The method of claim 1, wherein the conversion comprises decoding the video from the bitstream.

16. The method of claim 1, wherein the conversion comprises encoding the video into the bitstream.

17. An apparatus for processing video data comprising a processor and a non-transitory memory with instructions thereon, wherein the instructions upon execution by the processor, cause the processor to:
perform a conversion between a video and a bitstream of the video,
wherein the bitstream is organized into a plurality of access units (AUS), AU 0 to AU n, where n is a positive integer, each AU comprising one or more pictures,
wherein the conversion is performed according to a first format rule, and
wherein the first format rule specifies a first constraint related to a removal time of AU 0, and a second constraint related to a difference between consecutive coded picture buffer (CPB) removal times of AUs n and n−1, wherein the first constraint is based on (i) a value equal to a product of a maximum number of slices per picture and a number of pictures in an access unit and (ii) a maximum size of the access unit, and wherein the second constraint is based on a value equal to a product of a maximum number of slices per picture and a number of pictures in an access unit.

18. The apparatus of claim 17, wherein the conversion is performed according to a third format rule, wherein the third format rule specifies a constraint on a number of decoded pictures stored in a decoded picture buffer (DPB), and wherein each decoded picture of the decoded pictures is (i) marked as used for reference, or (ii) has a flag indicative of the decoded picture being output and has an output time later than a decoding time of a current picture.

19. A non-transitory computer-readable storage medium storing instructions that cause a processor to:
perform a conversion between a video and a bitstream of the video,
wherein the bitstream is organized into a plurality of access units (AUS), AU 0 to AU n, where n is a positive integer, each AU comprising one or more pictures,
wherein the conversion is performed according to a first format rule, and
wherein the first format rule specifies a first constraint related to a removal time of AU 0, and a second constraint related to a difference between consecutive coded picture buffer (CPB) removal times of AUs n and n−1, wherein the first constraint is based on (i) a value equal to a product of a maximum number of slices per picture and a number of pictures in an access unit and (ii) a maximum size of the access unit, and wherein the second constraint is based on a value equal to a product of a maximum number of slices per picture and a number of pictures in an access unit.

20. A non-transitory computer-readable recording medium storing a bitstream of a video which is generated by a method performed by a video processing apparatus, wherein the method comprises:
generating the bitstream of the video,
wherein the bitstream is organized into a plurality of access units (AUS), AU 0 to AU n, where n is a positive integer, each AU comprising one or more pictures,
wherein the bitstream is generated according to a first format rule, and
wherein the first format rule specifies a first constraint related to a removal time of AU 0, and a second constraint related to a difference between consecutive coded picture buffer (CPB) removal times of AUs n and n−1, wherein the first constraint is based on (i) a value equal to a product of a maximum number of slices per picture and a number of pictures in an access unit and (ii) a maximum size of the access unit, and wherein the second constraint is based on a value equal to a product of a maximum number of slices per picture and a number of pictures in an access unit.

* * * * *